US009344932B2

(12) United States Patent
Jung et al.

(10) Patent No.: US 9,344,932 B2
(45) Date of Patent: May 17, 2016

(54) METHOD FOR MOVING IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Anyang-si (KR);
Youngdae Lee, Anyang-si (KR);
Sungjun Park, Anyang-si (KR);
Seungjune Yi, Anyang-si (KR);
Sangwon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/385,702

(22) PCT Filed: Mar. 18, 2013

(86) PCT No.: PCT/KR2013/002173
§ 371 (c)(1),
(2) Date: Sep. 16, 2014

(87) PCT Pub. No.: WO2013/141538
PCT Pub. Date: Sep. 26, 2013

(65) Prior Publication Data
US 2015/0050934 A1    Feb. 19, 2015

Related U.S. Application Data

(60) Provisional application No. 61/612,349, filed on Mar. 18, 2012.

(51) Int. Cl.
*H04W 36/00* (2009.01)
*H04W 36/30* (2009.01)
(Continued)

(52) U.S. Cl.
CPC ............ *H04W 36/0083* (2013.01); *H04W 8/02* (2013.01); *H04W 36/30* (2013.01);
(Continued)

(58) Field of Classification Search
None
See application file for complete search history.

(56) References Cited

U.S. PATENT DOCUMENTS

2009/0280853 A1* 11/2009 Brisebois et al. ............. 455/522
2010/0195618 A1    8/2010 Park et al.
(Continued)

FOREIGN PATENT DOCUMENTS

KR   10-2006-0096172    9/2006
KR   10-2006-0099462    9/2006
(Continued)

OTHER PUBLICATIONS

PCT International Application No. PCT/KR2013/002173, Written Opinion of the International Searching Authority dated Jun. 28, 2013, 1 page.
Korean Intellectual Property Office Application Serial No. 10-2014-7026004, Office Action dated Nov. 6, 2015, 5 pages.

*Primary Examiner* — Leon-Viet Nguyen
(74) *Attorney, Agent, or Firm* — Lee Hong Degerman Kang & Waimey; Jonathan Kang; Jeffrey Lotspeich

(57) ABSTRACT

Provided is a method for moving carried out by a terminal in a wireless communication system. The method comprises estimating mobility status of the terminal, detecting a neighboring cell, calculating an expected dwell time in the neighboring cell which is detected, determining whether to set an adaptive mobility condition on the basis of the expected dwell time, and moving on the basis of the adaptive mobility condition when the adaptive mobility condition is determined to be set.

14 Claims, 18 Drawing Sheets

(51) Int. Cl.
*H04W 8/02* (2009.01)
*H04W 36/08* (2009.01)
*H04W 24/10* (2009.01)
*H04W 36/02* (2009.01)
*H04W 36/04* (2009.01)
*H04W 88/02* (2009.01)

(52) U.S. Cl.
CPC .............. *H04W 24/10* (2013.01); *H04W 36/02* (2013.01); *H04W 36/04* (2013.01); *H04W 36/08* (2013.01); *H04W 88/02* (2013.01)

(56) References Cited

U.S. PATENT DOCUMENTS

2010/0240356 A1   9/2010   Lee et al.
2011/0044264 A1*  2/2011   Chen et al. .................... 370/329
2011/0263262 A1  10/2011  Min et al.
2013/0244664 A1*  9/2013   Song et al. .................... 455/437

FOREIGN PATENT DOCUMENTS

KR   10-2011-0102945   9/2011
WO     2010/078589     7/2010

\* cited by examiner

METHOD FOR MOVING IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2013/002173, filed on Mar. 18, 2013, which claims the benefit of U.S. Provisional Application Ser. No. 61/612,349, filed on Mar. 18, 2012, the contents of which are all hereby incorporated by reference herein in their entirety.

BACKGROUND OF THE INVENTION

1. Field of the Invention

The present invention relates to wireless communication and, more particularly, to a mobility method performed by UE in a wireless communication system and an apparatus supporting the same.

2. Related Art $3^{rd}$ generation partnership project (3GPP) Long Term Evolution (LTE) is an improved version of a Universal Mobile Telecommunication System (UMTS) and is introduced as the 3GPP release 8. The 3GPP LTE uses Orthogonal Frequency Division Multiple Access (OFDMA) in a downlink, and uses Single Carrier-Frequency Division Multiple Access (SC-FDMA) in an uplink. The 3GPP LTE employs Multiple Input Multiple Output (MIMO) having up to four antennas. In recent years, there is an ongoing discussion on 3GPP LTE-Advanced (LTE-A) that is an evolution of the 3GPP LTE.

A micro cell, a femto cell, a pico cell, etc. having small service regions may be installed at a specific location of a macro cell having wide coverage.

Since UE represented as a mobile device moves, a cell having low quality of service now being provided or capable of providing better service may be detected. For this reason, the UE may move to a new cell, which is the execution of the mobility of the UE.

Frequency that UE performs mobility may vary according to circumstances because each cell has fixed coverage and the UE moves on a wireless communication system at a variable speed. In order to support the mobility of UE by taking the mobility state of the UE into consideration, Mobility State Estimation (MSE) and a method of scaling a mobility parameter have been supported. The UE may determine whether or not to report measurement results based on the MSE and the method, and the mobility of the UE may be performed based on the reported measurement results. Accordingly, the MSE and the scaling of a mobility parameter are closely related to the execution of the mobility of the UE.

Meanwhile, a wireless communication environment in which a macro cell and small cells coexist may be provided. Such a wireless communication environment may be called a heterogeneous network. In a heterogeneous network environment, several small cells may be present in the coverage of a macro cell. In such an environment, if UE moves based on a measurement report based on the existing MSE and mobility parameter scaling, a problem, such as a Radio Link Failure (RLF) or a handover failure, may occur. Accordingly, there is a need to provide a mobility method that can be adaptively executed depending on the mobility state of UE and the type of target cell in a communication environment in which a macro cell and small cells coexist.

SUMMARY OF THE INVENTION

An object of the present invention is to provide a mobility method performed by UE in a wireless communication system and an apparatus supporting the same.

In an aspect, there is provided a mobility method performed by user equipment in a wireless communication system. The method includes estimating a mobility state of the user equipment, detecting a neighbouring cell, calculating an expected residence time in the detected neighbouring cell, determining whether or not to set up an adaptive mobility condition based on the expected residence time, and moving based on the adaptive mobility condition if the adaptive mobility condition is determined to be set up.

Determining whether or not to set up the adaptive mobility condition may include determining to set up the adaptive mobility condition if the expected residence time is smaller than a specific reference value.

Moving based on the adaptive mobility condition may include scaling a mobility parameter, setting up the adaptive mobility condition, and moving to the detected neighbouring cell if the adaptive mobility condition is satisfied. The mobility parameter may be scaled based on a residence time scaling factor determined based on the expected residence time.

Being the adaptive mobility condition satisfied may include being a measurement result report condition satisfied during a time interval indicated by the scaled mobility parameter.

Moving to the detected neighbouring cell may include sending a measurement report to a serving cell, receiving a handover instruction message from the serving cell, and performing handover to the neighbouring cell.

Being the adaptive mobility condition satisfied may include being a cell reselection condition satisfied during a time interval indicated by the scaled mobility parameter.

Moving to the detected neighbouring cell may include performing cell reselection for the neighbouring cell.

Moving based on the adaptive mobility condition may include setting up the adaptive mobility condition by applying a mobility offset and moving to the detected neighbouring cell if the adaptive mobility condition is satisfied. The mobility offset may be determined based on the expected residence time.

Being the adaptive mobility condition satisfied may include being a measurement result report condition satisfied when the mobility offset is applied.

Moving to the detected neighbouring cell may include sending a measurement report to a serving cell, receiving a handover instruction message from the serving cell, and performing handover to the neighbouring cell.

Being the adaptive mobility condition satisfied may include being the cell reselection condition satisfied when the mobility offset is applied.

Moving to the detected neighbouring cell may include performing cell reselection to the detected neighbouring cell.

Calculating the expected residence time may include generating a variable parameter related to mobility based on the estimated mobility state, generating a variable parameter related to the size of the cell depending on the cell type of the detected neighbouring cell, and calculating the expected residence time by dividing the variable parameter related to the size of the cell by the variable parameter related to mobility.

The cell type of the detected neighbouring cell may be determined based on a list of small cells and the identity of the detected neighbouring cell provided by a serving cell.

the variable parameter related to mobility may be set as a high value as the estimated mobility state becomes high, the variable parameter related to the size of the cell may be set as a first value if the cell type is a macro cell, as a second value if the cell type is a pico cell, and as a third value if the cell type is a femto cell, and the first value $m_1$, the second value $m_2$, and the third value $m_3$ may have a relationship below.

$m_1 > m_2 > m_3$, wherein $m_1$, $m_2$, $m_3$ is a real number of 1 or higher.

In another aspect, there is provided a wireless apparatus operating in a wireless communication system. The wireless apparatus includes a Radio Frequency (RF) unit sending and receiving radio signals and a processor functionally coupled with the RF unit. The processor is configured to estimate a mobility state of the wireless apparatus, detect a neighbouring cell, calculate an expected residence time in the detected neighbouring cell, determine whether or not to set up an adaptive mobility condition based on the expected residence time, and move based on the adaptive mobility condition if the adaptive mobility condition is determined to be set up.

In accordance with an embodiment of the present invention, UE may adaptively move based on a mobility state and the type of target cell. UE can calculate an expected residence time and determine whether or not to set up adaptive mobility conditions, and handover and cell reselection can be performed based on the set mobility conditions. UE can be prevented from unnecessarily making attempts to move to a small cell, such as a pico cell and/or a femto cell. Accordingly, a Radio Link Failure (RLF) and a handover failure can be prevented. Furthermore, a traffic offloading effect of a heterogeneous network can be guaranteed through the execution of proper mobility.

DESCRIPTION OF EXEMPLARY EMBODIMENTS

Figure 1:
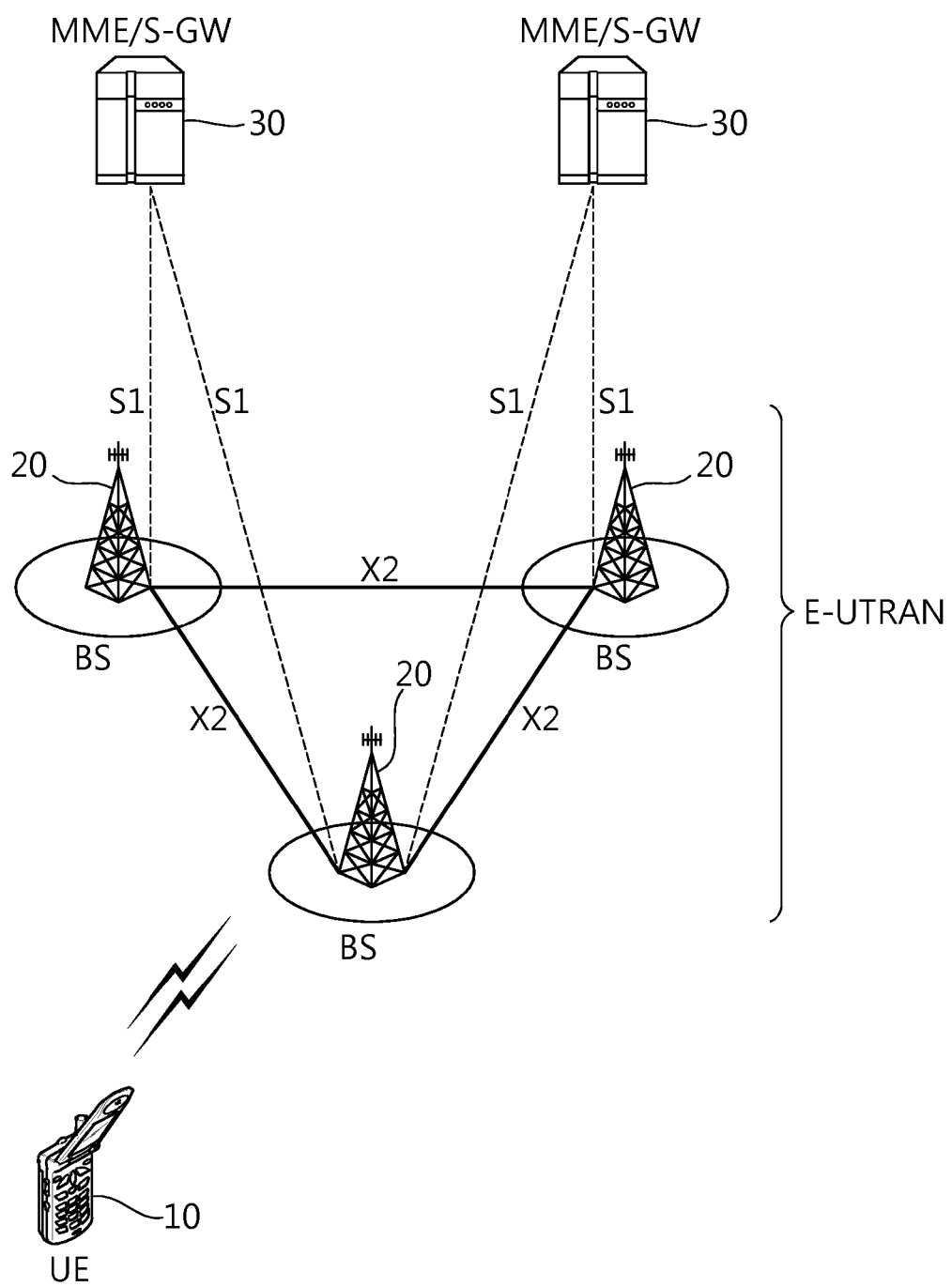
FIG. 1 illustrates a wireless communication system to which the present invention is applied.

FIG. 1 illustrates a wireless communication system to which the present invention is applied. The wireless communication system may also be referred to as an Evolved-UMTS Terrestrial Radio Access Network (E-UTRAN) or a Long Term Evolution (LTE)/LTE-A system.

The E-UTRAN includes at least one Base Station (BS) 20 which provides a control plane and a user plane to User Equipment (UE) 10. The UE 10 may be fixed or mobile, and may be referred to as another terminology, such as a Mobile Station (MS), a User Terminal (UT), a Subscriber Station (SS), a Mobile Terminal (MT), a wireless device, etc. The BS 20 is generally a fixed station that communicates with the UE 10 and may be referred to as another terminology, such as an evolved node-B (eNB), a Base Transceiver System (BTS), an access point, etc.

The BSs 20 are interconnected by means of an X2 interface. The BSs 20 are also connected by means of an 51 interface to an Evolved Packet Core (EPC) 30, more specifically, to a Mobility Management Entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a Radio Resource Control (RRC) layer belonging to the third layer serves to control a radio resource between the UE and the network. For this, the RRC layer exchanges an RRC message between the UE and the BS.

Figure 2:
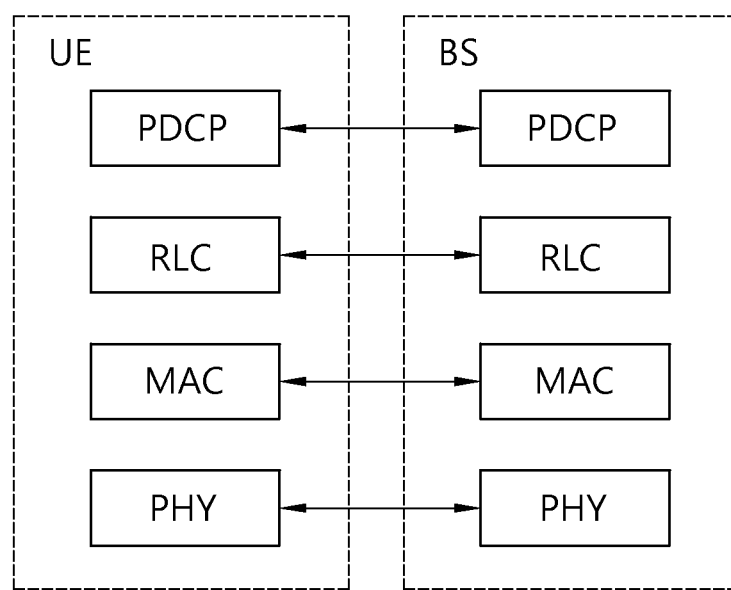
FIG. 2 is a block diagram illustrating a wireless protocol architecture on the user plane.
Figure 3:
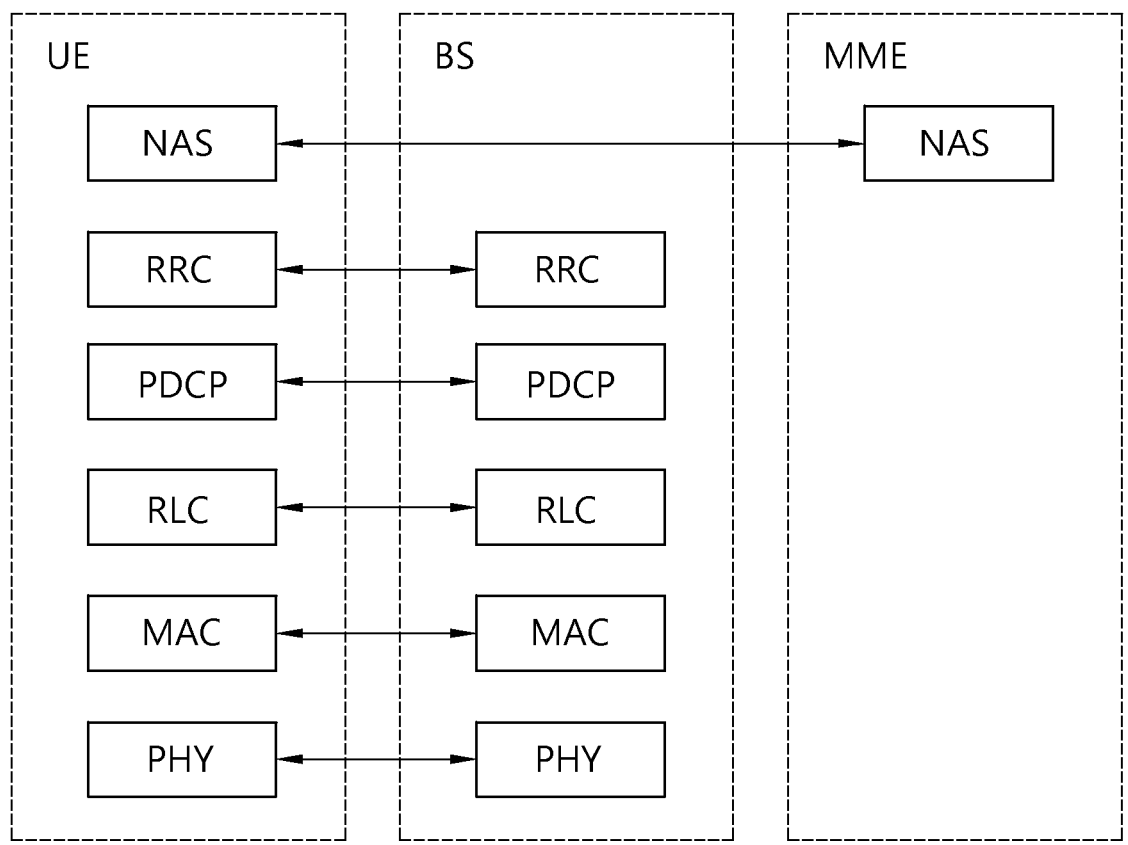
FIG. 3 is a block diagram illustrating a wireless protocol architecture on the control plane.

FIG. 2 is a diagram illustrating a wireless protocol architecture for a user plane. FIG. 3 is a diagram illustrating a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a Medium Access Control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (the MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

To configure an RB means a process of defining the characteristics of a wireless protocol layer and channels in order to provide a specific service and of configuring each detailed parameter and operating method. An RB may be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or a control message is transmitted. Traffic or a control message for downlink multicast or broadcast service may be transmitted through a downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
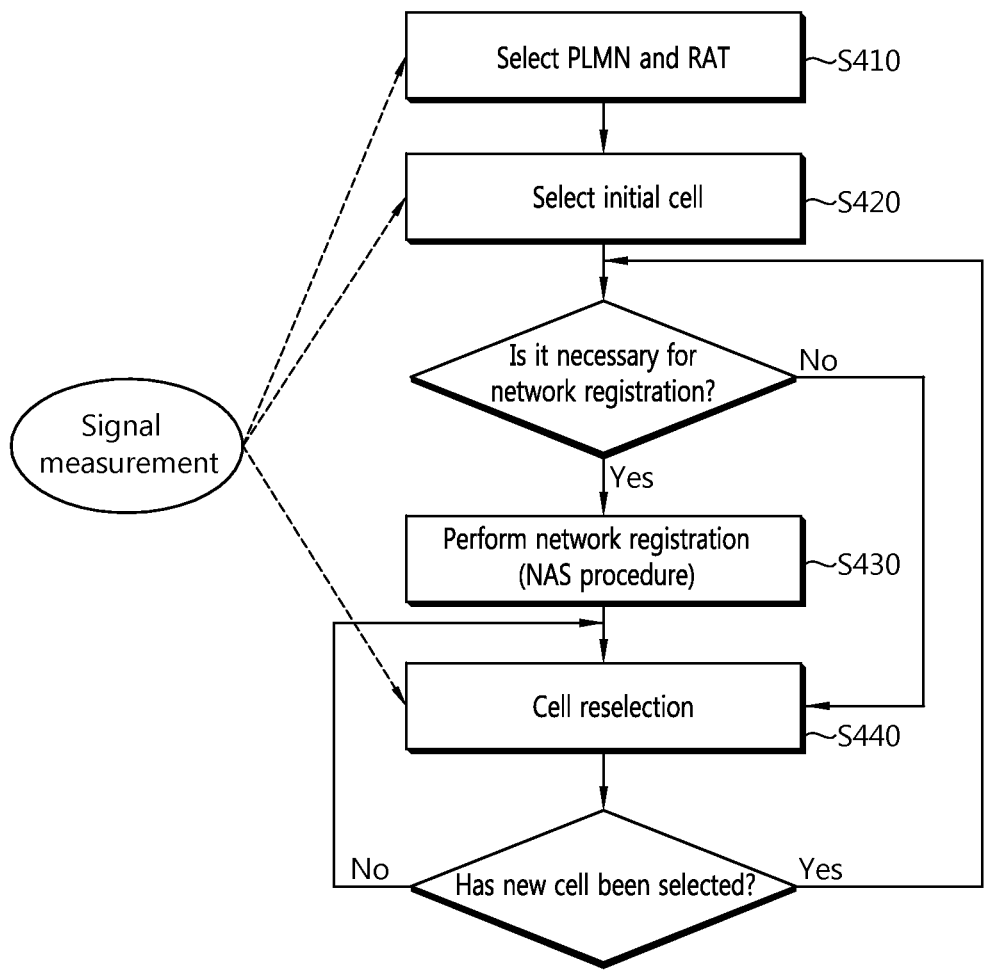
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighbouring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
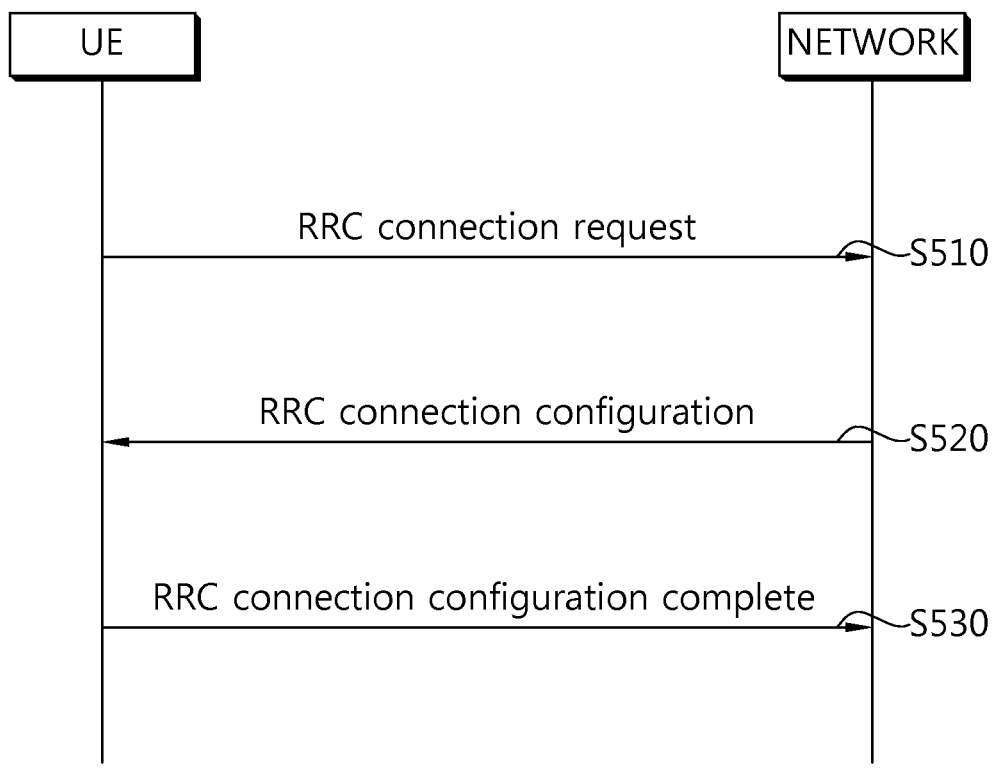
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
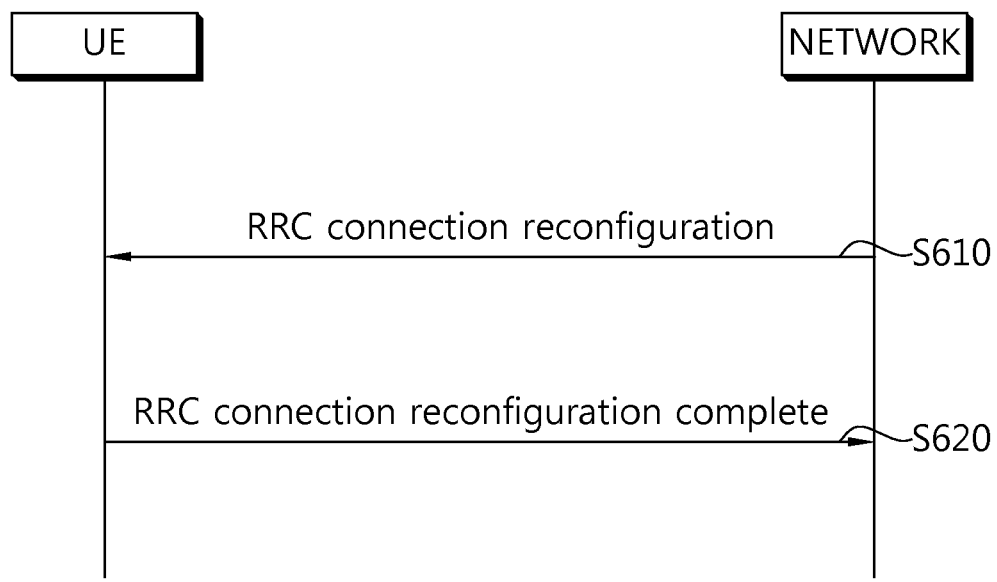
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). In response to the RRC connection reconfiguration message, the UE sends an RRC connection reconfiguration complete message used to check the successful completion of the RRC connection reconfiguration to the network (S620).

A procedure of selecting, by UE, a cell is described in detail.

When UE is powered on or camps on in a cell, the UE selects/reselects a cell having proper quality and performs procedures for being provided with service.

UE in the RRC idle state needs to always select a cell having proper quality and to be prepared to be provided with service through the cell. For example, UE that is initially powered on needs to select a cell having proper quality in order to register it with a network. If UE in the RRC connection state enters the RRC idle state, the UE needs to select a cell on which the UE will camp in the RRC idle state. As described above, a process of selecting, by UE, a cell that satisfies some conditions in order to camp on in a service standby state, such as the RRC idle state, is called cell selection. An important point is that the cell rapidly selects a cell because cell selection is performed in the state in which the UE has not determined a cell on which the UE will camp in the RRC idle state. Accordingly, if a cell is a cell that provides the quality of a radio signal of a specific reference or higher, the cell may be selected in the cell selection process of UE although the cell is not a cell that provides the best radio signal quality to the UE.

A method and procedure in which UE selects a cell in 3GPP LTE is described in detail with reference to 3GPP TS 36.304 V8.5.0 (2009-03) "User Equipment (UE) procedures in idle mode (Release 8)."

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identity of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell.

If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows First, UE measures the quality of a serving cell and neighbouring cells for cell reselection.

Second, cell reselection is performed based on a cell reselection criterion. The cell reselection criterion has the following characteristics in relation to the measurements of a serving cell and neighbouring cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,s} - Q_{offset}$$

In this case, $R_s$ is the ranking criterion of a serving cell, $R_n$ is the ranking criterion of a neighbouring cell, $Q_{meas,s}$ is the quality value of the serving cell measured by UE, $Q_{meas,n}$ is the quality value of the neighbouring cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbouring cell, $Q_{offset} = Q_{offsets,n}$. If UE does not $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbouring cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighbouring cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values $Q_{out}$ and $Q_{in}$. The threshold value $Q_{out}$ is defined as a level at which a downlink radio link is unable to be stably received, which corresponds to a block error rate of 10% of hypothetical PDCCH transmission by taking into consideration a PDFICH error. The threshold value $Q_{in}$ is defined as a downlink radio link quality level at which a downlink radio link is able to be more stably received than compared to the level of $Q_{out}$, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
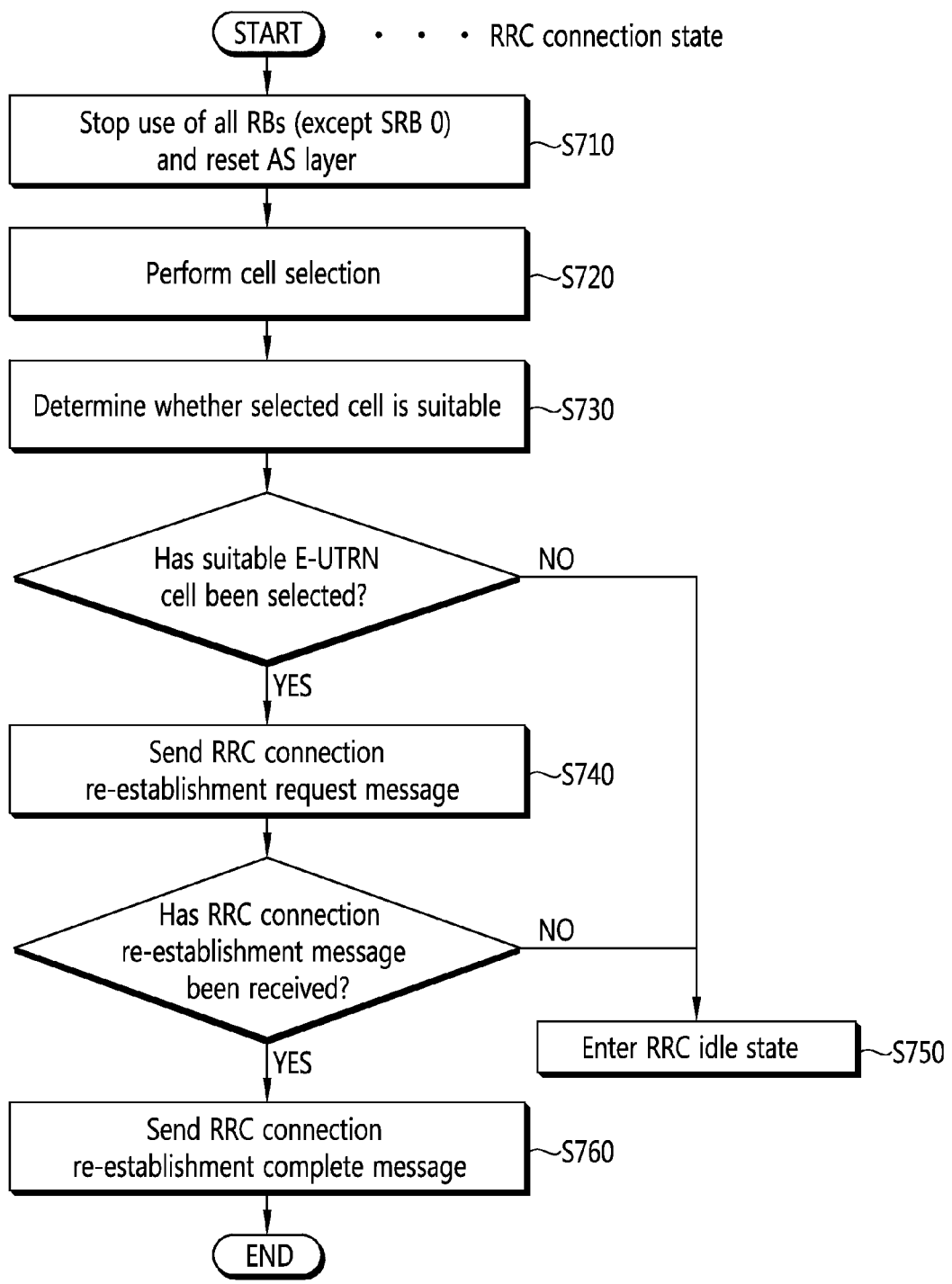
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurement.

A failure location.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Measurement and a measurement report are described below.

In a mobile communication system, to support the mobility of UE is essential. Accordingly, the UE continues to measure the quality of a serving cell from which the UE is now provided with service and the quality of a neighbouring cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighbouring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighbouring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

Figure 8:
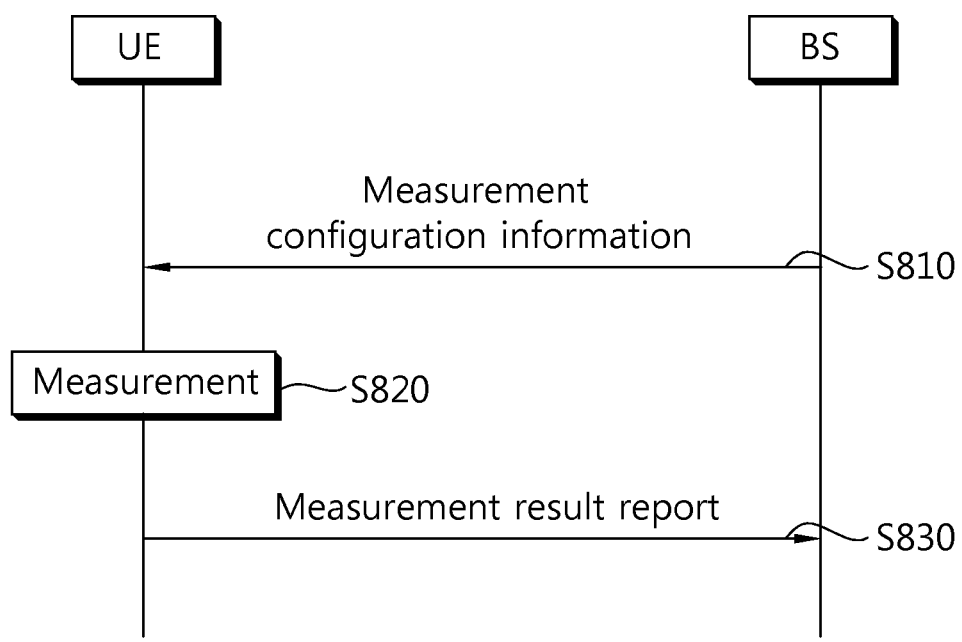
FIG. 8 is a flowchart illustrating a method of performing measurement.

FIG. 8 is a flowchart illustrating a method of performing measurement.

UE receives measurement configuration information from a BS (S810). A message including the measurement configuration information is called a measurement configuration message. The UE performs measurements based on the measurement configuration information (S820). If measured results satisfy a report condition within the measurement configuration information, the UE reports the measured results to the BS (S830). A message including the measured results is called a measurement report message.

The measurement configuration information may include the following information.

(1) Measurement object information: it is information about the object on which UE will perform measurement. A measurement object includes at least one of an intra-frequency measurement object that is the object of measurement within a cell, an inter-frequency measurement object that is the object of measurement between cells, and an inter-RAT measurement object that is the object of inter-RAT measurement. For example, the intra-frequency measurement object may indicate a neighbouring cell having the same frequency band as a serving cell, the inter-frequency measurement object may indicate a neighbouring cell having a frequency band different form that of a serving cell, and the inter-RAT measurement object may indicate a neighbouring cell having RAT different from that of a serving cell.

(2) Reporting configuration information: this is information about a report condition regarding when UE reports measured results and a report type. The report condition may include information about an event or cycle on which the report of the measured results is triggered. The report type is information regarding that the measured results will be configured in what type.

(3) Measurement identity information: this is information about a measurement identity that associates a measurement object with a reporting configuration so that UE determines to report what measurement object when and in what type. Each measurement identity associates a single measurement object with a single reporting configuration. By configuring a plurality of measurement identities, one or more reporting configurations may be associated with the same measurement object, and one or more measurement objects may also be associated with the same reporting configuration. A measurement identity may be used as a reference numeral within a measurement report. Measurement identity information may be included in a measurement report message, and may be indicative that measured results are for which measurement object and that a measurement report has occurred due to what report condition.

(4) Quantity configuration information: quality configuration information defines the amount of measurement and defines associated filtering used for reports related to the evaluation of all events and measurement types thereof. A single filter may be set in each measurement quantity.

(5) Measurement gap information: this is information about a measurement gap, that is, a section that may be used for UE to perform only measurement by not taking into consideration data transmission with a serving cell because downlink transmission or uplink transmission has not been scheduled.

In order to perform a measurement procedure, UE has a measurement object list, a measurement reporting configuration list, and a measurement identity list.

In 3GPP LTE, a BS may configure only one measurement object for a single frequency band in relation to UE. In accordance with Paragraph 5.5.4 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| Events | Report Conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measured results of UE satisfy a set event, the UE sends a measurement report message to a BS.

Figure 9:
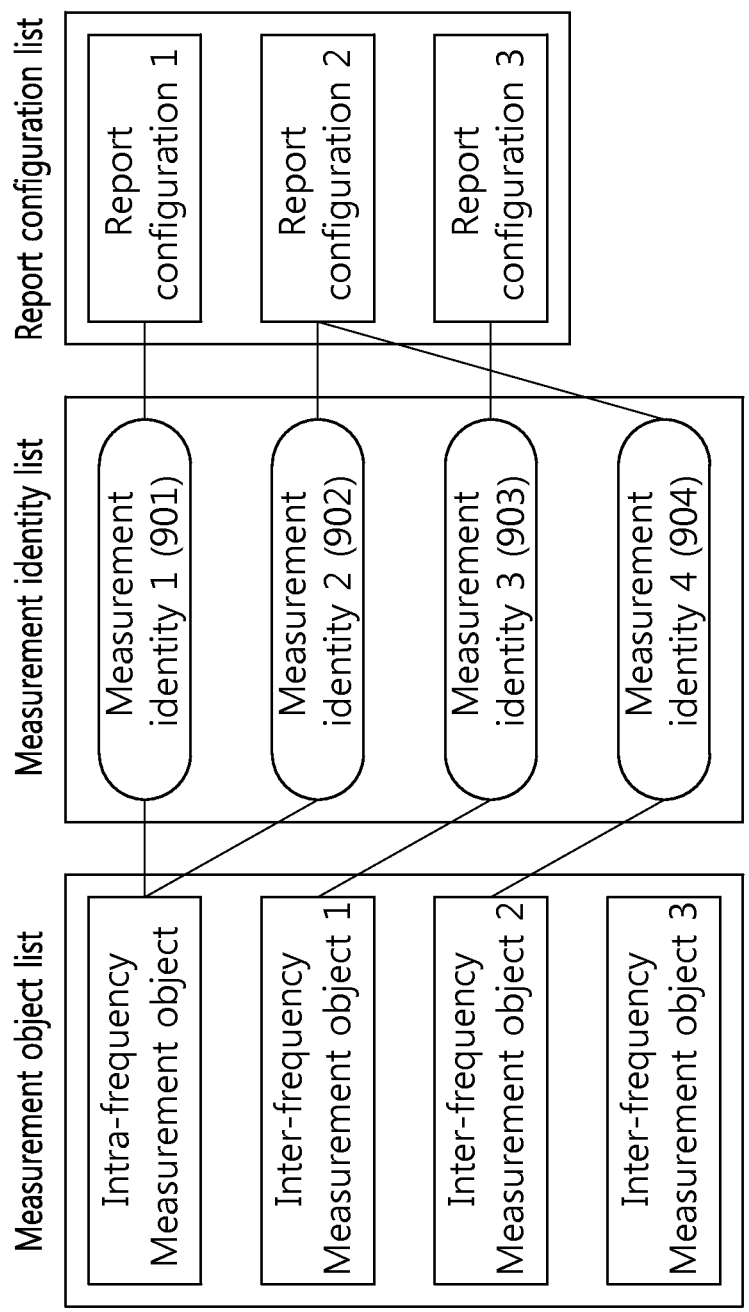
FIG. 9 illustrates an example of a measurement configuration configured to UE.

FIG. 9 illustrates an example of a measurement configuration configured to UE.

First, a measurement identity 1 901 connects an intra-frequency measurement object and a reporting configuration 1. UE performs intra-cell measurement (intra-frequency measurement), and the reporting configuration 1 is used to determine the criterion of a measurement result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measurement result report and a report type.

In accordance with the measurement identity 1 901 and the measurement identity 2 902, UE sends the measured results of the intra-frequency measurement object although the measured results satisfy any one of the reporting configuration 1 and the reporting configuration 2.

A measurement identity 3 903 connects an inter-frequency measurement object 1 and a reporting configuration 3. UE reports the measured results of the inter-frequency measurement object 1 if the measured results satisfy a report condition included in the reporting configuration 1.

A measurement identity 4 904 connects an inter-frequency measurement object 2 and the reporting configuration 2. UE reports the measured results of the inter-frequency measurement object 2 if the measured results satisfy a report condition included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
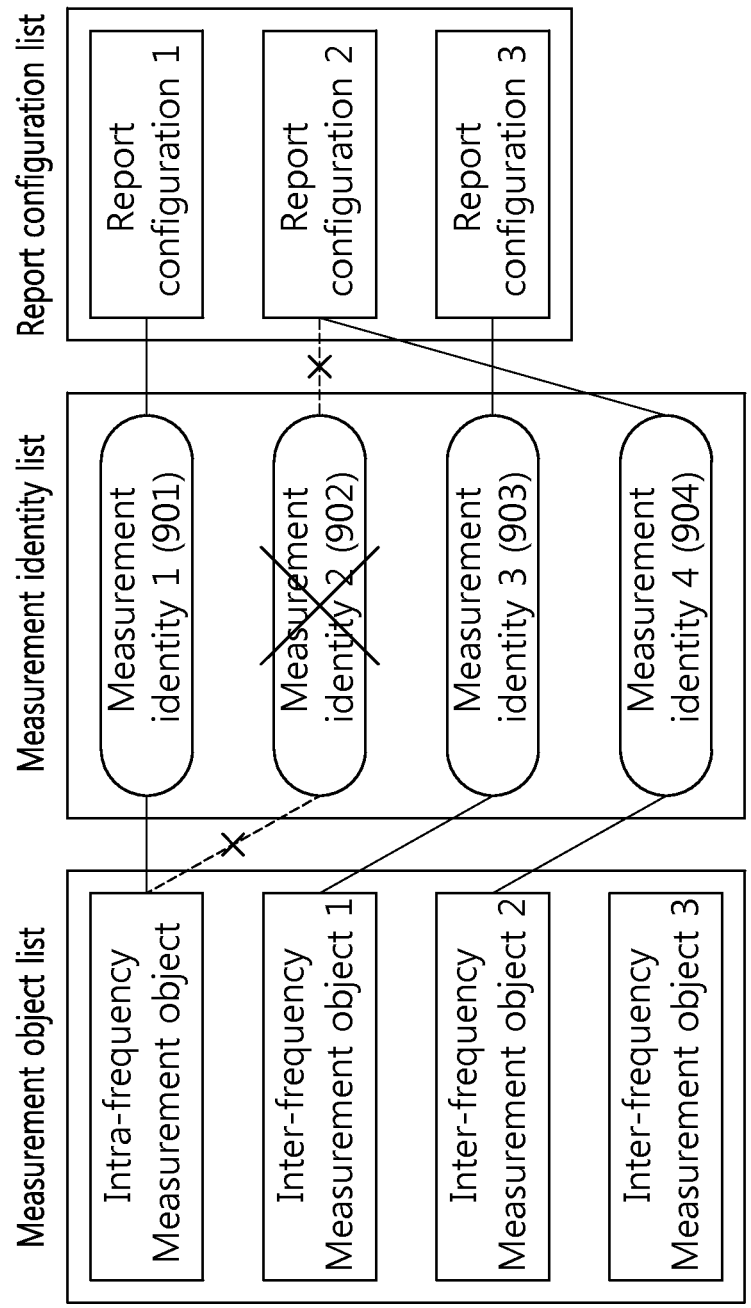
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or a reporting configuration associated with a measurement identity may not be changed.

Figure 11:
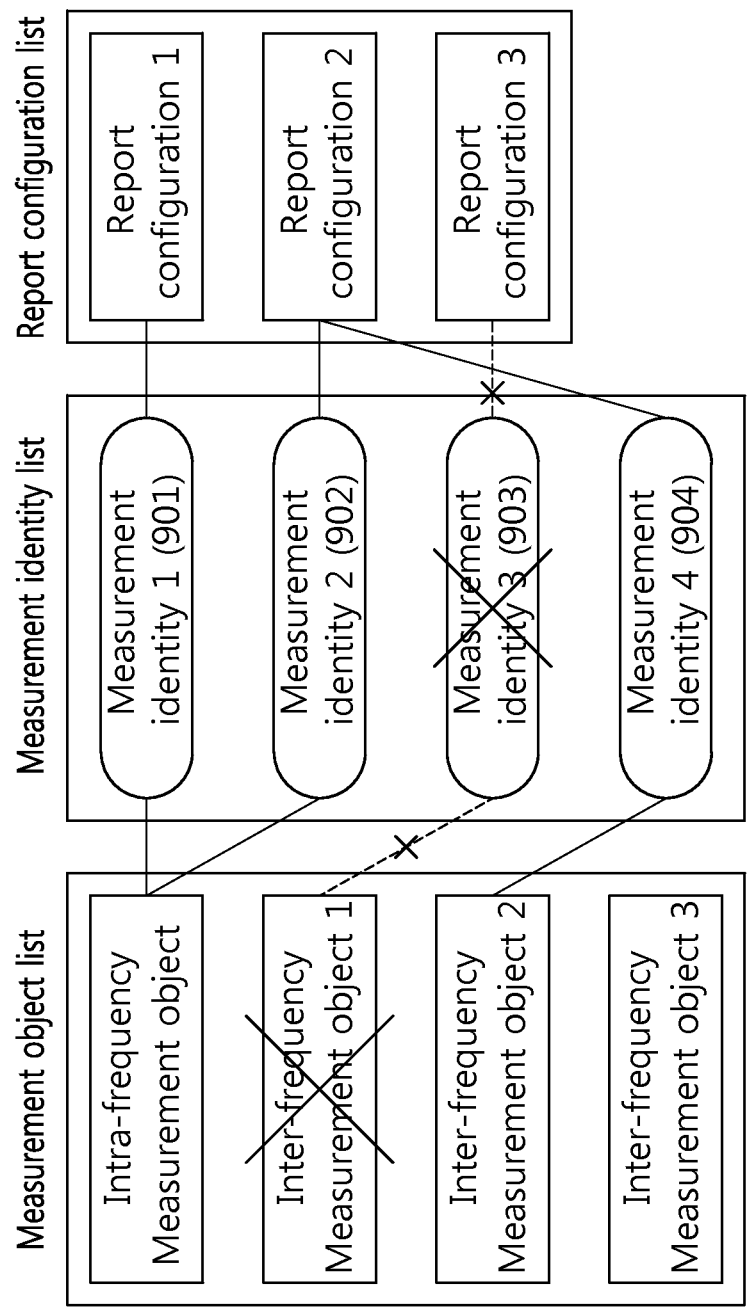
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with a deleted reporting configuration may not be changed or deleted.

A measurement report may include a measurement identity, the measured quality of a serving cell, and the measured results of a neighbouring cell. A measurement identity identifies a measurement object whose measurement report has been triggered. The measured results of a neighbouring cell may include the cell identity and measured quality of the neighbouring cell. Measured quality may include at least one of Reference Signal Received Power (RSRP) and Reference Signal Received Quality (RSRQ).

The scaling of a parameter related to mobility that affects the determination of UE regarding whether or not to perform mobility based on the mobility state of the UE is described below. If UE passes through cells at high speed, the UE may be subjected to an available service state because mobility to neighbouring cells is not properly performed. Accordingly, if the value of a parameter related to mobility is optimized for the speed of UE depending on the speed of the UE, the performance of mobility of the UE is improved. If UE determines a mobility state (performs mobility state estimation) and scales a parameter related to the determination of mobility based on the determined mobility state of the UE as described above, the mobility of the UE may be supported more efficiently.

The mobility states of UE may be classified into a high mobility state, a medium mobility state, and a normal mobility state. Each of the mobility states may be determined based on the number of times that UE has performed handover and/or the number of times that UE has performed cell reselection.

UE in the RRC_IDLE state performs cell reselection if a cell reselection condition is satisfied. If the number of times that the UE has performed cell reselection during a specific time interval $T_{CRmax}$ exceeds a first threshold $N_{CR\_H}$, the mobility state of the UE satisfies the condition of the high mobility state. Meanwhile, if the number of times that the UE has performed cell reselection during the specific time interval $T_{CRmax}$ exceeds a second threshold $N_{CR\_M}$ and does not exceed the first threshold $N_{CR\_H}$, the mobility state of the UE satisfies the condition of the medium mobility state. If the number of times that the UE has performed cell reselection during the specific time interval $T_{CRmax}$ does not exceed the second threshold $N_{CR\_M}$, the mobility state of the UE satisfies the condition of the normal mobility state. In this case, if the UE has consecutively performed cell reselection between two identical cells, the number of times that the UE has consecutively performed such cell reselection may not be counted as the number of times that the UE has performed cell reselection.

UE in the RRC_CONNECTED state reports the results of measurement and performs handover, if a specific condition is satisfied when performing the measurement on a neighbouring cell. If the number of times that the UE has performed handover during a specific time interval exceeds a first threshold, the mobility state of the UE satisfies the condition of the high mobility state. Meanwhile, if the number of times that the UE has performed handover during the specific time interval exceeds a second threshold and does not exceed the first threshold, the mobility state of the UE satisfies the condition of the medium mobility state. If the number of times that the UE has performed handover during the specific time interval does not exceed the second threshold, the mobility state of the UE satisfies the condition of the normal mobility state.

UE in the RRC_IDLE state or the RRC_CONNECTED state may enter a corresponding mobility state if the UE detects that the condition of the aforementioned mobility state has been satisfied. To enter a corresponding mobility state may mean that the UE determines that its own mobility state is the corresponding mobility state. In this case, if both the high mobility state condition and the medium mobility state condition are determined to be not satisfied during a specific time interval, the UE may enter the normal mobility state.

After determining a mobility state, UE may scale a mobility parameter based on the mobility state. UE in the RRC_IDLE state may scale a Treselection parameter, and UE in the RRC_CONNECTED state may scale a TimeToTrigger parameter. Such scaling may be implemented by multiplying the Treselection parameter or TimeToTrigger parameter by a specific scaling factor. The scaling factor may be different depending on the mobility state of the UE. For example, a scaling factor in the high mobility state may be smaller than that in the medium mobility state. In the normal mobility state, scaling may not be performed. Such scaling may be performed by a network or a cell in addition to UE, and information about the execution of scaling may be provided to UE.

Scaling applied to the Treselection parameter that is used for UE in the RRC_IDLE state to perform cell reselection is first described in detail.

1) In the case of the normal mobility state (not the medium/high mobility state)
Treselection is not scaled.

2) In the case of the high mobility state
In the E-UTRAN, $Treselection_{EUTRA}$ is multiplied by a scaling factor "sf-high" and is scaled.
In the UTRAN, $Treselection_{UTRA}$ is multiplied by the scaling factor "sf-high" and is scaled.
In the GERAN, $Treselection_{GERA}$ is multiplied by the scaling factor "sf-high" and is scaled.
In CDMA2000 HRPD, $Treselection_{CDMA\_HRPD}$ is multiplied by the scaling factor "sf-high" and is scaled.
In CDMA2000 1xRTT, $Treselection_{CDMA\_1xRTT}$ is multiplied by the scaling factor "sf-high" and is scaled.

3) In the case of the medium mobility state
In the E-UTRAN, $Treselection_{EUTRA}$ is multiplied by a scaling factor "sf-medium" and is scaled.
In the UTRAN, $Treselection_{UTRA}$ is multiplied by the scaling factor "sf-medium" and is scaled.
In the GERAN, $Treselection_{GERA}$ is multiplied by the scaling factor "sf-medium" and is scaled.
In CDMA2000 HRPD, $Treselection_{CDMA\_HRPD}$ is multiplied by the scaling factor "sf-medium" and is scaled.
In CDMA2000 1xRTT, $Treselection_{CDMA\_1xRTT}$ is multiplied by the scaling factor "sf-medium" and is scaled.

An information parameter (e.g., a scaling factor) for the scaling of the Treselection parameter by UE in the RRC_IDLE state may be included in broadcasted system information and provided to the UE. If an information parameter for scaling is included in the system information, UE may perform scaling.

Scaling applied to the TimeToTrigger parameter that is used for UE in the RRC_CONNECTED state to perform a measurement report and/or handover is described in detail below.

1) In the case of the normal mobility state (not the medium/high mobility state)
TimeToTrigger is not scaled.

2) In the case of the high mobility state

TimeToTrigger is multiplied by the scaling factor "sf-high" and is scaled.

3) In the case of the medium mobility state

TimeToTrigger is multiplied by the scaling factor "sf-medium" and is scaled.

If a mobility parameter differently scaled depending on the mobility state of UE is applied as described above, mobility can be more properly performed. For example, if UE in the RRC_IDLE state moves at high speed, the UE may determine whether or not a condition for performing cell reselection has been satisfied within a shorter time and rapidly perform cell reselection on a target cell. Furthermore, if UE in the RRC_CONNECTED state moves at high speed, the UE may determine whether or not a measurement result report condition is satisfied during a specific time within a shorter time, may report a result of the determination, and may perform handover to a target cell more rapidly.

If overhead is generated in the traffic of cells having a specific frequency, a network can support offloading for reducing overhead by moving UE to cells having another frequency. A small cell having smaller cell coverage than a macro cell, for example, a pico cell or a femto cell may be used to effectively offload the overhead traffic of specific cell coverage. Furthermore, cells having small coverage, such as a pico cell and a femto cell, have recently been greatly spotlighted in terms of the network operation and management strategies of operators because they have advantageous of a network configuration and operation cost. A wireless communication environment in which a macro cell having wide coverage and small cells (a pico cell, a femto cell) having relatively small coverage coexist as described above may be called a heterogeneous network.

If UE that is provided with service from a macro cell moves, the UE may be provided with service from a corresponding cell when the UE is placed in the coverage of a small cell. Meanwhile, small cells, such as a pico cell and a femto cell, may be cells having frequency characteristics different from those of a serving cell that now provides service to UE, that is, inter-frequency cells. In order for traffic offloading to an inter-frequency cell to be normally performed, UE needs to notify a corresponding serving cell of the detection of the presence of a corresponding cell if the UE detects that the corresponding cell is present in small cell coverage. To this end, a macro cell configures an inter-frequency cell measurement configuration for UE. The UE may always perform measurement on an inter-frequency cell based on the measurement configuration received from the macro cell.

Figure 12:
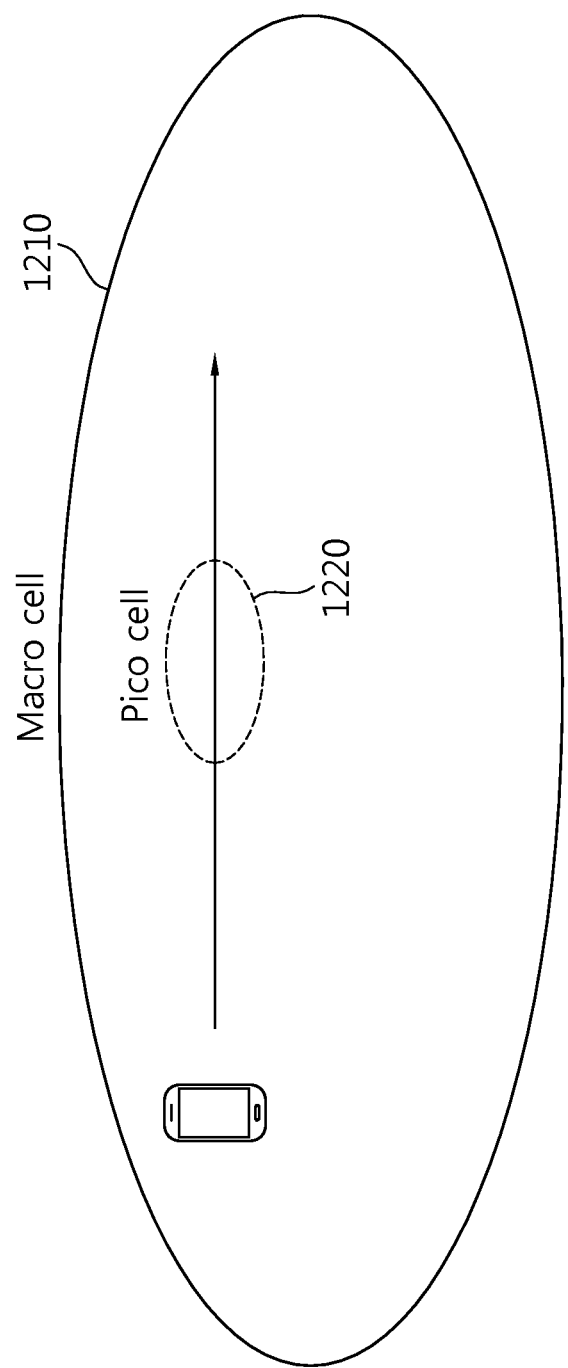
FIG. 12 is a diagram illustrating an example of a wireless communication system to which an embodiment of the present invention may be applied.

FIG. 12 is a diagram illustrating an example of a wireless communication system to which an embodiment of the present invention may be applied.

Referring to FIG. 12, a pico cell 1220 having relatively narrow coverage is present within the coverage of a macro cell 1210. It is assumed that UE is located outside the coverage of the pico cell 1220 within the coverage of the macro cell 1210 at the early stage, but the UE may enter the coverage of the pico cell 1220 through mobility and also may deviate from the coverage of the pico cell 1220.

If the time that the UE is connected to the pico cell 1220 during mobility is the time that the UE may be sufficiently provided with service from the pico cell 1220 because the mobility speed of the UE is sufficiently low or the UE may be sufficiently provided with service because the time that the UE resides in the pico cell 1220 is sufficiently long although the UE is moving, a traffic offloading effect through the installation of a small cell within the macro cell may be achieved although the aforementioned MSE and the scaling of a mobility parameter (e.g., Treselection and TimeToTrigger) are applied.

In contrast, as the mobility speed of the UE becomes faster, the time that the UE resides in the pico cell 1220 may become shorter. In such a case, a traffic offloading effect through the installation of a small cell is small or almost not present because the time that the UE is connected to the pico cell 1220 and provided with service is very short. That is, the UE moving at fast speed may access the pico cell 1220 through the existing MSE and scaling of a mobility parameter, but soon deviates from the coverage of the pico cell 1220. Accordingly, an actual traffic offloading effect from the macro cell to the pico cell may be very limited.

In addition, if the UE attempts to perform cell reselection and/or handover on the pico cell 1220 through the MSE and the scaling of a mobility parameter, the UE may deviate from the coverage of the pico cell 1220 while performing mobility to a corresponding cell. In such a case, an RLF and/or a handover failure may occur.

In a heterogeneous network environment, although UE moving at high speed enters the coverage of a small cell, such as a pico cell and/or a femto cell, such mobility to the small cell may deteriorate service provided to the UE and also deteriorate overall efficiency of a communication system. Accordingly, in such a communication environment, an efficient mobility method may need to be provided.

In order to supplement problems that may occur as described above, the present invention proposes a method of determining, by UE, an expected residence time in a small cell, such as a pico cell or a femto cell, when the UE moves to the small cell and adaptively performing mobility based on the expected residence time.

Figure 13:
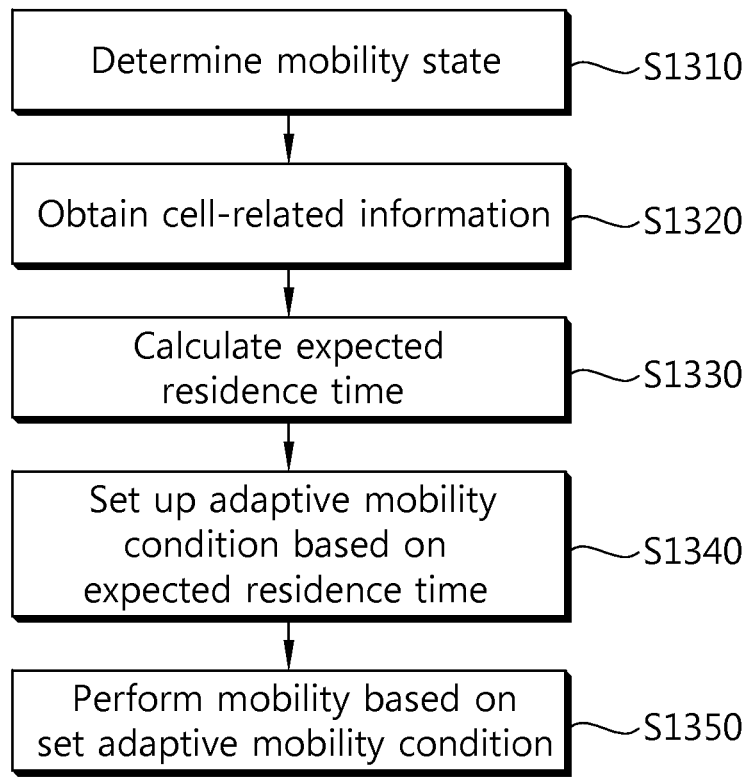
FIG. 13 is a flowchart illustrating a mobility method in accordance with an embodiment of the present invention.

FIG. 13 is a flowchart illustrating a mobility method in accordance with an embodiment of the present invention.

Referring to FIG. 13, UE determines a mobility state (S1310). To determine, by the UE, the mobility state may include performing MSE determined to be the high mobility state/medium mobility state/normal mobility state depending on whether or not the UE performs mobility during a specific time interval. If the UE is equipped with a GNSS, to determine the mobility state may be performed based on speed of the UE that has been received through the GNSS. In such a case, the mobility state of the UE may have been determined based on the speed itself of the UE. Alternatively, the mobility state of the UE may be determined to be a specific mobility state classified based on the speed of the UE.

The UE discovers a cell that enters coverage and obtains information related to the cell (S1320). To obtain, by the UE, the information related to the discovered cell may include obtaining the PCI of the corresponding cell.

The UE calculates an expected residence time (S1330). The expected residence time may be determined based on a variable parameter related to mobility of the UE and a variable parameter related to the size of the corresponding cell.

The variable parameter related to mobility of the UE may be determined based on the determined mobility state of the UE. If the determined mobility state is a mobility state according to the existing MSE, the variable parameter related to mobility may be mapped to a specific integer value depending on the mobility state of the UE. For example, the variable parameter related to mobility may be mapped to 3 in the case of the high mobility state, 2 in the case of the medium mobility state, and 1 in the case of the normal mobility state. Furthermore, the variable parameter related to mobility may be set as the number of times that mobility has been performed during a specific time interval in order to determine a mobility state according to MSE. If the UE is provided with location service from a GNSS, the variable parameter related to mobility may be set as actual speed of the UE. Furthermore, the variable parameter related to mobility may be set as a specific value mapped every actual speed interval.

The variable parameter related to the size of the cell may be determined based on network signalling. A network may provide the UE with a list of small cells. The list of small cells may include a pico cell list and/or a femto cell list. The pico cell list may include a PCI list of cells whose cell type is a pico cell. The femto cell list may include a PCI list of cells whose cell type is a femto cell. The PCI list may be implemented as a set of PCIs for each frequency. If a cell is discovered while moving, the UE may obtain information related to the PCI of a corresponding cell and check the type of corresponding cell based on a list of small cells and the obtained PCI. If the PCI list is implemented as a set of PCIs for each frequency, the UE may check the type of corresponding cell based on the PCI and frequency of the corresponding cell when discovering the corresponding cell. The UE may set the variable parameter related to the size of the cell as a specific value based on the determined type of the corresponding cell.

The UE calculates the expected residence time based on the variable parameter related to mobility and the variable parameter related to the size of the cell that are determined as described above. The expected residence time may be set as a value obtained by dividing the variable parameter related to the size of the cell by the variable parameter related to mobility.

The UE sets an adaptive mobility condition based on the expected residence time (S1340). The UE may determine whether or not to apply the adaptive mobility condition by comparing the expected residence time with a specific reference value. If the expected residence time is smaller than the specific reference value, the UE may determine to apply the adaptive mobility condition. If the expected residence time is smaller than the specific reference value, it may mean that the time taken for the UE to perform mobility to the corresponding cell may not be sufficient. The specific reference value may be a value previously set in the UE or may be a value signalled by a network. The specific reference value may be differently set depending on a corresponding cell type.

If the adaptive mobility condition is determined to be applied, the UE configures an adaptive mobility condition to be applied. The configuration of the adaptive mobility condition by the UE may be implemented as follows.

1) Not Apply the Scaling of a Mobility Parameter

If the UE determines to apply the adaptive mobility condition, the UE may not apply scaling using a scaling factor to a mobility parameter according to MSE. For example, although the mobility state of the UE according to MSE is in the high mobility state or the medium mobility state, the UE may not apply a scaling factor to the Treselection or TimeToTrigger parameter.

2) Apply a New Scaling Factor Determined Based on the Expected Residence Time

If the UE determines to apply the adaptive mobility condition, the UE may set a new scaling factor based on the expected residence time instead of an existing scaling factor differently applied based on the mobility state of the UE. This is called a residence time-based scaling factor. The UE may apply the residence time-based scaling factor to the Treselection or TimeToTrigger parameter.

The residence time-based scaling factor may be set as a different value depending on the value of an expected residence time. A network may provide at least one threshold for determining the residence time-based scaling factor. The residence time-based scaling factor may be set as a different value based on the at least one threshold. A detailed residence time-based scaling factor may be implemented as follows.

An expected residence time<a threshold 1, a residence time-based scaling factor=value 1

The expected residence time>a threshold 2, a residence time-based scaling factor=value 2

The threshold 2≤the expected residence time≤the threshold 1, a residence time-based scaling factor=value 3

The UE may apply the residence time-based scaling factor, determined as described above, to the Treselection or TimeToTrigger parameter.

3) Apply an Offset Value Determined Based on the Expected Residence Time

The UE may apply a specific offset value in order to determine whether or not a condition for cell reselection has been satisfied. Furthermore, in reporting a measurement result for handover, the UE may apply the specific offset value to a measurement result report condition. The specific offset value may be determined based on the expected residence time. As described above, the specific offset may be called a mobility offset.

If the adaptive mobility condition is determined to be applied, the mobility offset may be set as a value not 0, preferably, may be set as a negative value. In contrast, if the adaptive mobility condition is determined to be not applied, the mobility offset value is not applied. That is, the mobility offset value may be set as 0. A detailed value of the mobility offset set as a value not 0 may be previously set in the UE or may be set by a network. The value may be set as a different value depending on the type of corresponding cell.

Additionally, an offset scaling factor may be applied to the mobility offset of a specific value. The offset scaling factor may be set as a different value based on the value of an expected residence time. A network may provide at least one threshold for determining the offset scaling factor, and the offset scaling factor may be set as a different value based on the at least one threshold. A detailed offset scaling factor may be implemented as follows.

An expected residence time<a threshold 1, an offset scaling factor=value 1

The expected residence time>a threshold 2, an offset scaling factor=value 2

The threshold 2≤the expected residence time≤the threshold 1, an offset scaling factor=value 3

If an offset scaling factor is applied, when determining whether or not a cell reselection condition is satisfied and whether or not a measurement result report condition is satisfied, the UE may incorporate a mobility offset to which the offset scaling factor has been applied into the cell reselection condition and the measurement result report condition. A detailed example in which whether or not the measurement result report condition is satisfied is determined if the mobility offset is applied may be as follows.

If a mobility offset is applied to a report condition according to an event A3, a detailed report condition may be set up as in Equation 2.

$$Mn+Ofn+Ocn-Hys+\text{mobility\_offset}>Mp+Ofp+Ocp+Off$$

Mn is a measurement result of a neighbouring cell to which an offset has not been applied.

Ofn is a specific frequency offset for the frequency of the neighbouring cell. For example, Ofn may be a frequency offset value defined in a target of measurement according to the frequency of a neighbouring cell.

Ocn is the cell specific offset of the neighbouring cell. For example, Ocn may be a cell offset value defined in a target of measurement according to the frequency of a neighbouring cell.

Mp is a measurement result of a PCell to which an offset has not been applied.

Ofp is a specific frequency offset for a primary frequency. For example, Ofp may be a frequency offset value defined in a target of measurement according to a primary frequency.

Ocp is a cell specific offset for a PCell. For example, Ocp may be a cell offset value defined in a target of measurement according to a primary frequency.

Hys is a hysteresis parameter for a report event. The hysteresis parameter may be defined in a reporting configuration message according to the report event.

Off is an offset parameter for a report event. The offset parameter may be defined in the reporting configuration message according to the report event.

mobility_offset is an offset parameter according to the present event. mobility_offset may be configured like the aforementioned mobility offset.

Mn, Mp may be represented in dBm in the case of RSRP and may be represented in dB in the case of RSRQ.

Ofn, Ocn, Ofp, Ocp, Hys, Off may be represented in dB.

The UE sets up an adaptive mobility condition and performs mobility based on the set adaptive mobility condition (S1350).

If the adaptive mobility condition is set up, the UE may determine whether or not to perform cell reselection based on the mobility parameter Treselection that has been scaled according to a specific criterion. If the adaptive mobility condition is set up, the UE may determine whether or not to report a measurement result for handover based on the mobility parameter TimeToTrigger that has been scaled according to a specific criterion.

If the adaptive mobility condition is set up, the UE may apply a mobility offset value when determining whether or not a cell reselection execution condition has been satisfied and may perform cell reselection based on the mobility offset. If the adaptive mobility condition is set up, the UE may apply the mobility offset value and determine whether or not a measurement result report condition has been satisfied.

Figure 14:
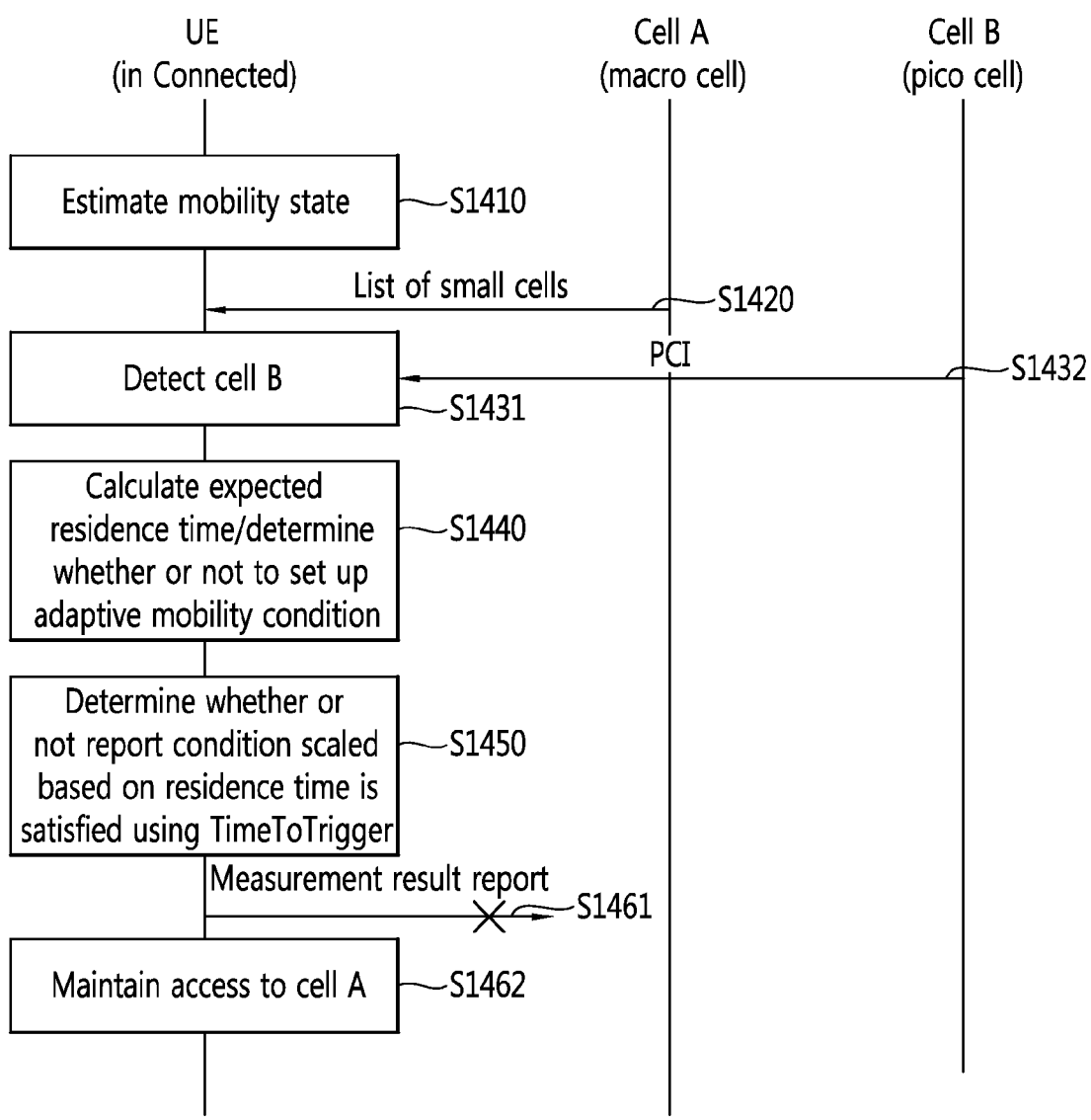
FIG. 14 is a flowchart illustrating an example of a method of performing mobility in accordance with an embodiment of the present invention.

FIG. 14 is a flowchart illustrating an example of a method of performing mobility in accordance with an embodiment of the present invention. In the example of FIG. 14, it is assumed that UE is the RRC_CONNECTED state and has approached a cell A, that is, a macro cell.

Referring to FIG. 14, the UE estimates a current mobility state (S1410). To estimate, by the UE, current mobility state may include performing MSE. To estimate the current mobility state of the UE may include obtaining information about actual speed through a GNSS. In the present example, it is assumed that the mobility state of the UE is in the high mobility state.

The UE obtains a list of small cells from the cell A (S1420). The list of small cells may be implemented as a PCI list of cells, that is, pico cells and/or femto cells.

While in motion, the UE may detect a cell B (S1431), and the UE may obtain the PCI of the cell B (S1432). The UE may be aware of the cell type of the cell B using the PCI of the cell B and the list of small cells. In the present example, the UE may be aware that the cell B is a pico cell.

The UE calculates an expected residence time and determines whether or not an adaptive mobility condition have been set up (S1440). The UE may set a variable parameter related to mobility through the determined mobility state and set a variable parameter related to the size of the cell through the cell type of the cell B. The UE may calculate the expected residence time based on the variable parameter related to mobility and the variable parameter related to the size of the cell, which has been described with reference to step S1330 of FIG. 13. In the present example, the type of cell B corresponds to a small cell, that is, a pico cell. Accordingly, the expected residence time may be set to be shorter compared to a case where the detected cell is a macro cell.

The UE may determine whether or not to set up the adaptive mobility condition based on the calculated expected residence time. As described above with reference to FIG. 13, the UE may determine whether or not to set up the adaptive mobility condition by comparing the expected residence time with a specific value. For example, if the expected residence time is greater than the specific value, the UE may determine to not set up the adaptive mobility condition. If the expected residence time is not greater than the specific value, the UE may determine to set up the adaptive mobility condition. In the present example, the UE that has determined to set up the adaptive mobility condition may set a residence time-based scaling factor based on the expected residence time. An example in which the residence time-based scaling factor is set has been described above, and a detailed description thereof is omitted. The UE may scale a mobility parameter using the residence time-based scaling factor.

The UE may determine whether or not a measurement result report condition has been satisfied using the mobility parameter scaled using the residence time-based scaling factor (S1450). The UE may determine whether or not a specific report event of report conditions according to a measurement configuration configured by the previous cell A has been generated and whether or not the report event continues to be satisfied during the scaled parameter TimeToTrigger.

In the present example, the UE may set an adaptive mobility condition because an expected residence time may be calculated relatively short. Accordingly, the UE sets the residence time-based scaling factor and scales the parameter TimeToTrigger using the residence time-based scaling factor. In such a case, mobility to a corresponding cell can be more smoothly performed because the value of the parameter TimeToTrigger is reduced when an existing scaling parameter according to MSE is scaled. In contrast, if the parameter TimeToTrigger is scaled using the residence time-based scaling factor, the value of the parameter TimeToTrigger may be relatively increased compared to the existing value of the parameter TimeToTrigger. Accordingly, since a time interval during which a report event needs to be maintained is increased, the UE's direct handover to a small cell may be relatively limited compared to existing handover. Alternatively, the report event may be no longer maintained because the UE can pass through the small cell before the time interval during which the report event needs to be maintained elapses.

After determining that the report condition has not been satisfied based on the expected residence time-based scaling factor as described above, the UE may not report a measurement result to the cell A (S1461) and may maintain access to the cell A, that is, a macro cell (S1462).

Figure 15:
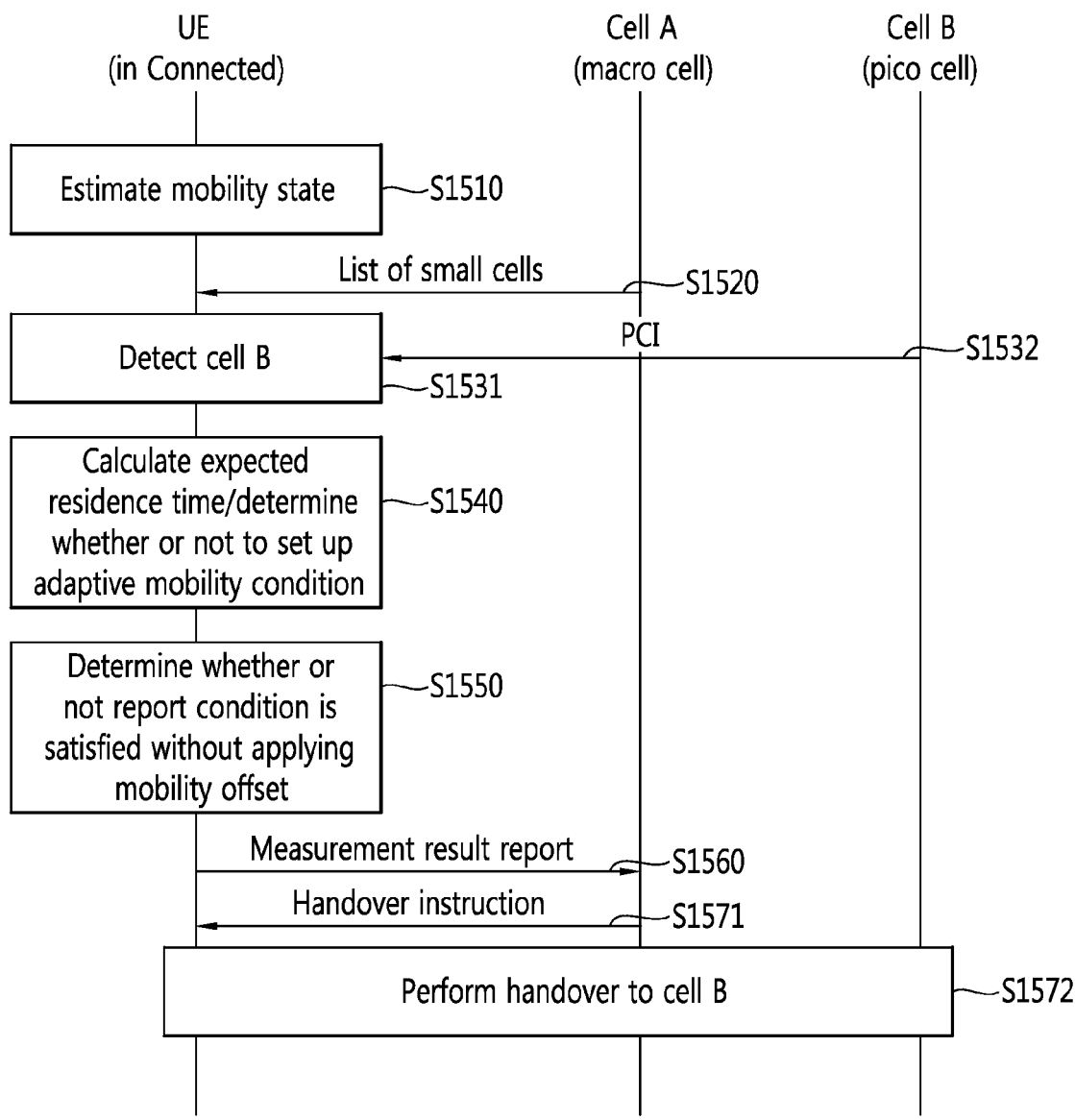
FIG. 15 is a flowchart illustrating another example of a mobility method in accordance with an embodiment of the present invention.

FIG. 15 is a flowchart illustrating another example of a mobility method in accordance with an embodiment of the present invention. In the example of FIG. 15, it is assumed that UE is in the RRC_CONNECTED state and has approached a cell A, that is, a macro cell.

Referring to FIG. 15, the UE estimates a current mobility state (S1510), obtains a list of small cells from the cell A (S1520), detects a cell B (S1531), and obtains the PCI of the cell B (S1532). The UE may be aware that the type of cell B is a macro cell based on the PCI. The detailed operations of the UE in respective steps are the same as those of the aforementioned steps S1410, S1420, S1431, and S1432 of FIG. 14, and a detailed description thereof is omitted.

The UE calculates an expected residence time and determines whether or not to set up an adaptive mobility condition (S1540). The UE may set a variable parameter related to mobility based on the determined mobility state and set a variable parameter related to the size of a cell based on the cell type of the cell B. The UE may calculate the expected residence time based on the variable parameter related to mobility and the variable parameter related to the size of the cell, which has been described in step S1330 of FIG. 13. In the present example, the type of cell B is a macro cell and does not correspond to a small cell. Accordingly, the expected residence time may be relatively long set compared to a case where a detected cell is a pico cell and/or a femto cell as in FIG. 14.

The UE determines whether or not to set up the adaptive mobility condition based on the calculated expected residence time. As described above with reference to FIG. 13, the UE may determine whether or not to set up the adaptive mobility condition by comparing the expected residence time with a specific value. For example, if the expected residence time is greater than the specific value, the UE may determine to not set up the adaptive mobility condition. If the expected residence time is not greater than the specific value, the UE may determine to set up the adaptive mobility condition. In the present example, after determining to not set up the adaptive mobility condition, the UE may determine to not additionally apply a mobility offset in determining whether a measurement result report condition is satisfied or not.

The UE does not apply a mobility offset and determines whether or not the measurement result report condition is satisfied (S1550). If the measurement result report condition is determined to be satisfied, the UE may report a measurement result to the cell A (S1560), may receive a handover instruction message corresponding to the measurement result (S1571), and may perform handover to the cell B (S1572).

In the example of FIG. 15, if the cell B is a small cell, such as a pico cell or femto cell, the UE may calculate a shorter expected residence time. The UE may set up the adaptive mobility condition based on the shorter expected residence time and apply a mobility offset in determining whether or not a measurement result report condition is satisfied.

Figure 16:
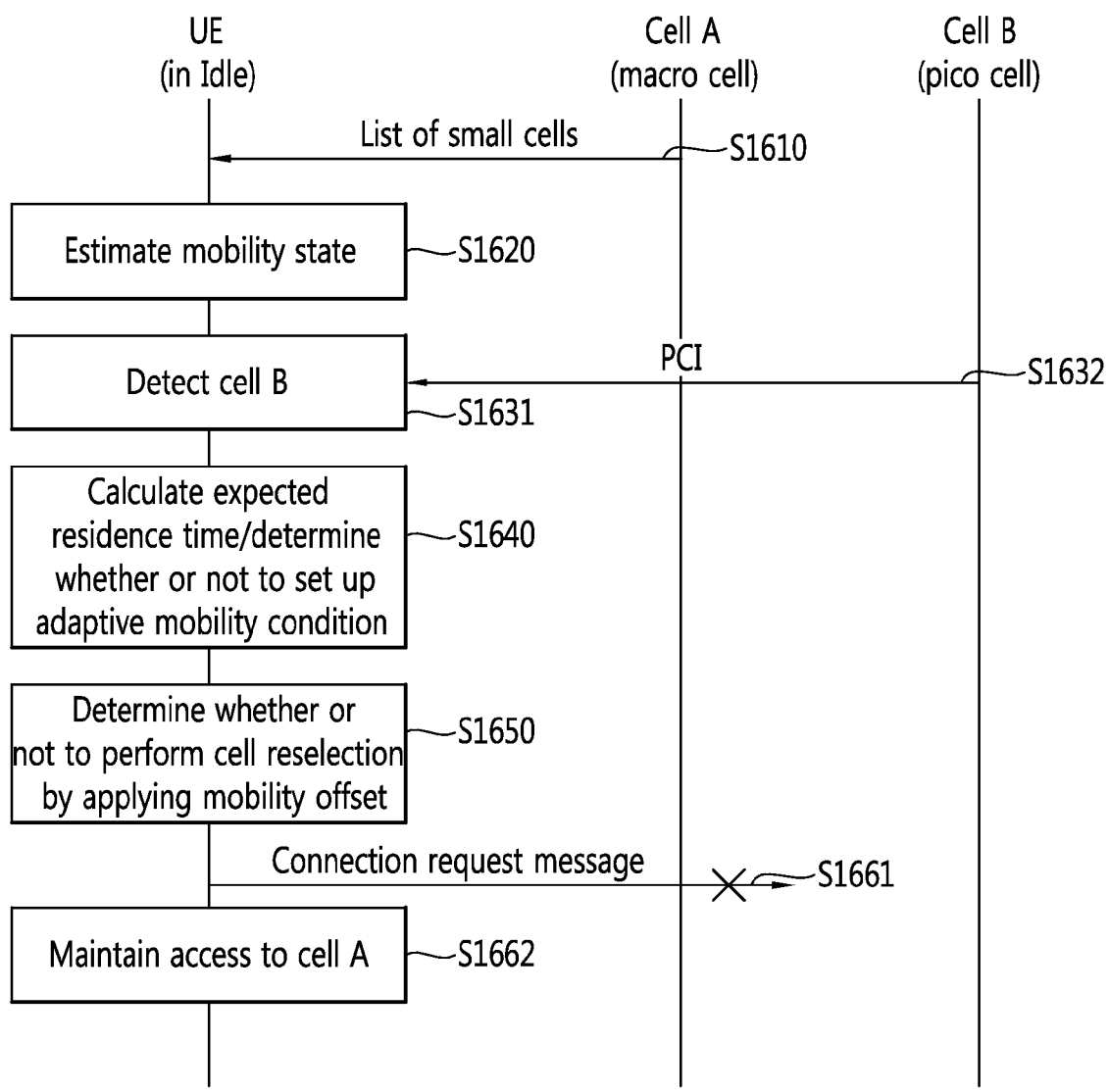
FIG. 16 is a flowchart illustrating another example of a mobility method in accordance with an embodiment of the present invention.

FIG. 16 is a flowchart illustrating another example of a mobility method in accordance with an embodiment of the present invention. In the example of FIG. 16, it is assumed that UE is in the RRC_IDLE state and has approached a cell A, that is, a macro cell.

Referring to FIG. 16, the UE obtains a list of small cells from the cell A (S1610). The list of small cells may be implemented as a PCI list of cells, that is, pico cells and/or femto cells.

The UE estimates a current mobility state (S1620). To estimate, by the UE, the current mobility state may include performing MSE. To estimate, by the UE, the current mobility state may include obtaining information about actual speed through a GNSS. In the present example, it is assumed that the mobility state of the UE is in the high mobility state The UE while moving detects a cell B (S1631) and obtains the PCI of the cell B (S1632). The UE may be aware of the cell type of the cell B based on the PCI of the cell B and the list of small cells. In the present example, the UE may be aware that the cell B is a femto cell.

The UE calculates an expected residence time and determines whether or not to set up an adaptive mobility condition (S1640). The UE may set a variable parameter related to mobility based on the determined mobility state and set a variable parameter related to the size of the cell based on the cell type of the cell B. The UE may calculate the expected residence time based on the variable parameter related to mobility and the variable parameter related to the size of the cell, which has been described above in step S1330 of FIG. 13. In the present example, the type of cell B is a femto cell and corresponds to a small cell. Accordingly, the expected residence time may be short set compared to a case where the detected cell is a macro cell.

The UE determines whether or not to set up the adaptive mobility condition based on the calculated expected residence time. As described above with reference to FIG. 13, the UE may determine whether or not to set up the adaptive mobility condition by comparing the expected residence time with a specific value. For example, if the expected residence time is greater than the specific value, the UE may determine to not set up the adaptive mobility condition. If the expected residence time is not greater than the specific value, the UE may determine to set up the adaptive mobility condition. In the present example, the UE that has determined to set up the adaptive mobility condition may determine to additionally apply a mobility offset. The setting of the mobility offset has been described above with reference to FIG. 13, and a detailed description thereof is omitted.

The UE determines whether or not a cell reselection condition is satisfied by applying the mobility offset (S1650). In the present example, since the expected residence time may be relatively short calculated, the UE may set up the adaptive mobility condition. Accordingly, the UE may set a residence time-based mobility offset and apply the residence time-based mobility offset in determining whether or not the cell reselection condition is satisfied. Since the value of the mobility offset is a negative value, the cell reselection of the UE for the cell B, that is, a femto cell, may be further limited compared to a case where a mobility offset is not applied.

The UE that has determined that the cell reselection condition is not satisfied based on the residence time-based mobility offset as described above may not perform cell reselection for the cell B (S1661) and maintain the access to the cell A, that is, a macro cell (S1662).

Figure 17:
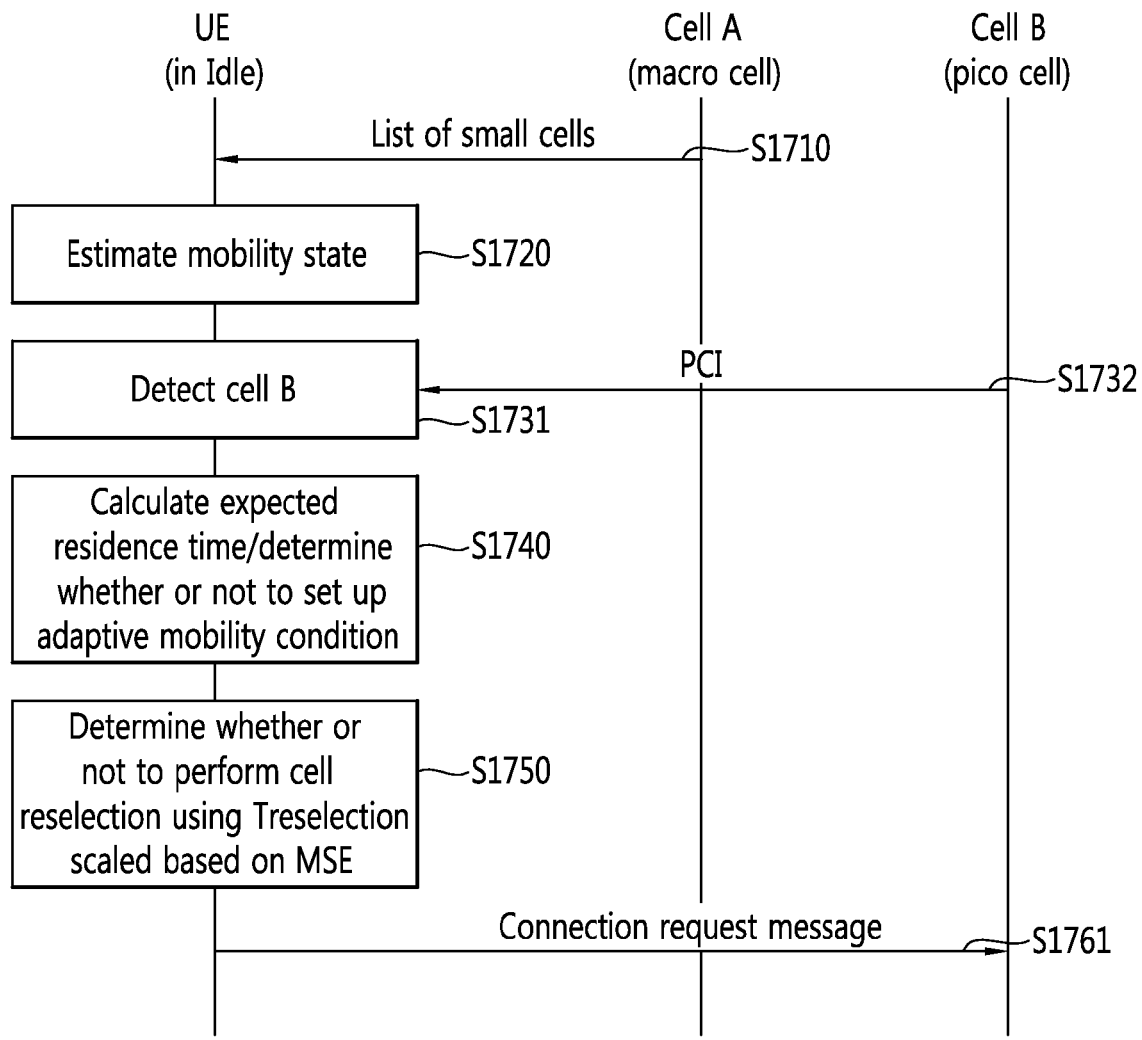
FIG. 17 is a flowchart illustrating another example of a mobility method in accordance with an embodiment of the present invention.

FIG. 17 is a flowchart illustrating another example of a mobility method in accordance with an embodiment of the present invention. In the example of FIG. 17, it is assumed that UE is in the RRC_IDLE state and has approached a cell A, that is, a macro cell.

Referring to FIG. 17, the UE obtains a list of small cells from the cell A (S1710), estimates a current mobility state (S1720), detects a cell B (S1731), and obtains the PCI of the cell B (S1732). The UE may be aware that the type of cell B is a macro cell based on the PCI. The detailed operations of the UE in respective steps are the same as those of the aforementioned steps S1610, S1620, S1631, and S1632 of FIG. 16, and a detailed description thereof is omitted.

The UE calculates an expected residence time and determines whether or not to set up an adaptive mobility condition (S1740). The UE may set a variable parameter related to mobility based on the determined mobility state and set a variable parameter related to the size of a cell based on the cell type of the cell B. The UE may calculate the expected residence time based on the variable parameter related to mobility and the variable parameter related to the size of the cell, which has been described in step S1330 of FIG. 13. In the present example, the type of cell B is a macro cell and does not correspond to a small cell. Accordingly, the expected residence time may be relatively long set compared to a case where a detected cell is a pico cell and/or a femto cell.

The UE determines whether or not to set up the adaptive mobility condition based on the calculated expected residence time. As described above with reference to FIG. 13, the UE may determine whether or not to set up the adaptive mobility condition by comparing the expected residence time with a specific value. For example, if the expected residence time is greater than the specific value, the UE may determine to not set up the adaptive mobility condition. If the expected residence time is not greater than the specific value, the UE may determine to set up the adaptive mobility condition. In the present example, after determining to not set up the adaptive mobility condition, the UE may determine to not apply an expected residence time-based scaling factor, but may determine to apply an existing scaling factor based on a mobility state according to MSE.

The UE determines whether or not the cell reselection condition has been satisfied using the mobility parameter scaled based on the scaling factor according to MSE (S1750). The UE applies the scaling factor according to the high mobility state to the parameter Treselection and checks whether or not the cell reselection condition is maintained during the scaled Treselection.

If the cell reselection condition is satisfied, the UE may initiate cell reselection by sending a connection request message to the cell B (S1760).

In accordance with the embodiments of the present invention described above with reference to FIGS. 13 to 17, UE may adaptively perform mobility based on its mobility state and the type of target cell. UE may calculate an expected residence time, may determine whether or not to set up an adaptive mobility condition, and may perform handover and cell reselection based on the set mobility condition. Through such an operation, UE estimated to rapidly move or to be in a fast mobility state can be prevented from attempting to unnecessarily move to a small cell, such as a pico cell and/or a femto cell. Accordingly, an RLF and a handover failure can be prevented. Furthermore, a traffic offloading effect of a heterogeneous network can be guaranteed through proper mobility.

Figure 18:
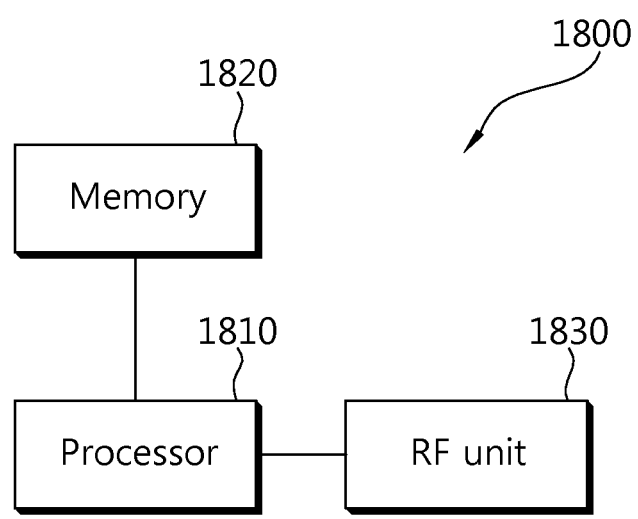
FIG. 18 is a block diagram illustrating a wireless apparatus in which an embodiment of the present invention is implemented.

FIG. 18 is a block diagram illustrating a wireless apparatus in which an embodiment of the present invention is implemented. The apparatus may implement the operations of the UE and/or the network that performs the embodiments described above with reference to FIGS. 13 to 17.

The wireless apparatus 1800 includes a processor 1810, memory 1820, and a Radio Frequency (RF) unit 1830. The processor 1810 implements the proposed functions, processes and/or methods. The processor 1810 is configured to estimate the mobility state of the wireless apparatus 1800 and to obtain information about a target cell. The processor 1810 is configured to calculate the time during which the wireless apparatus 1800 is expected to reside in the target cell. The processor 1810 sets up an adaptive mobility condition based on the expected residence time and to move based on the set condition. The processor 1810 may be configured to implement the embodiments of the present invention described above with reference to the drawings.

The RF unit 1830 is connected to the processor 1810 and sends and receives radio signals.

The processor 1810 and the RF unit 1830 may be implemented to send and receive radio signals according to one or more communication standards. The RF unit 1830 may include one or more transceivers capable of sending and receiving radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A mobility method performed by user equipment in a wireless communication system, the method comprising:
   estimating a mobility state of the user equipment;
   detecting a neighbouring cell;
   calculating an expected residence time in the detected neighbouring cell;
   determining to set up an adaptive mobility condition when the expected residence time is smaller than a specific reference value;
   setting up the adaptive mobility condition by applying a mobility offset, wherein the mobility offset is determined based on the expected residence time; and
   moving to the detected neighbouring cell if the adaptive mobility condition is satisfied.

2. The mobility method of claim 1, wherein moving based on the adaptive mobility condition comprises:
   scaling a mobility parameter and setting up the adaptive mobility condition, wherein the mobility parameter is scaled based on a residence time scaling factor determined based on the expected residence time; and
   moving to the detected neighbouring cell if the adaptive mobility condition is satisfied.

3. The mobility method of claim 2, wherein being the adaptive mobility condition satisfied comprises being a measurement result report condition satisfied during a time interval indicated by the scaled mobility parameter.

4. The mobility method of claim 3, wherein moving to the detected neighbouring cell comprises:
   sending a measurement report to a serving cell;
   receiving a handover instruction message from the serving cell; and
   performing handover to the neighbouring cell.

5. The mobility method of claim 2, wherein being the adaptive mobility condition satisfied comprises being a cell reselection condition satisfied during a time interval indicated by the scaled mobility parameter.

6. The mobility method of claim 5, wherein moving to the detected neighbouring cell comprises performing cell reselection for the neighbouring cell.

7. The mobility method of claim 1, wherein being the adaptive mobility condition satisfied comprises being a measurement result report condition satisfied when the mobility offset is applied.

8. The mobility method of claim 7, wherein moving to the detected neighbouring cell comprises:
   sending a measurement report to a serving cell;
   receiving a handover instruction message from the serving cell; and
   performing handover to the neighbouring cell.

9. The mobility method of claim 1, wherein being the adaptive mobility condition satisfied comprises being the cell reselection condition satisfied when the mobility offset is applied.

10. The mobility method of claim 9, wherein moving to the detected neighbouring cell comprises performing cell reselection to the detected neighbouring cell.

11. The mobility method of claim 1, wherein calculating the expected residence time comprises:
   generating a variable parameter related to mobility based on the estimated mobility state;
   generating a variable parameter related to a size of the cell depending on a cell type of the detected neighbouring cell; and
   calculating the expected residence time by dividing the variable parameter related to the size of the cell by the variable parameter related to mobility.

12. The mobility method of claim 11, wherein the cell type of the detected neighbouring cell is determined based on a list of small cells and an identity of the detected neighbouring cell provided by a serving cell.

13. The mobility method of claim 12, wherein:
   the variable parameter related to mobility is set as a high value as the estimated mobility state becomes high,
   the variable parameter related to the size of the cell is set as a first value if the cell type is a macro cell, as a second value if the cell type is a pico cell, and as a third value if the cell type is a femto cell, and
   the first value $m_1$, the second value $m_2$, and the third value $m_3$ have a relationship below,
   $m_1 > m_2 > m_3$, wherein $m_1$, $m_2$, $m_3$ is a real number of 1 or higher.

14. A wireless apparatus operating in a wireless communication system, comprising:
   a Radio Frequency (RF) unit sending and receiving radio signals; and
   a processor functionally coupled with the RF unit, wherein the processor is configured to:
   estimate a mobility state of the wireless apparatus;
   detect a neighbouring cell;
   calculate an expected residence time in the detected neighbouring cell;
   determine to set up an adaptive mobility condition when the expected residence time is smaller than a specific reference value;
   set up the adaptive mobility condition by applying a mobility offset, wherein the mobility offset is determined based on the expected residence time; and
   move to the detected neighbouring cell if the adaptive mobility condition is satisfied.

* * * * *